Sheet 2. 2 Sheets.

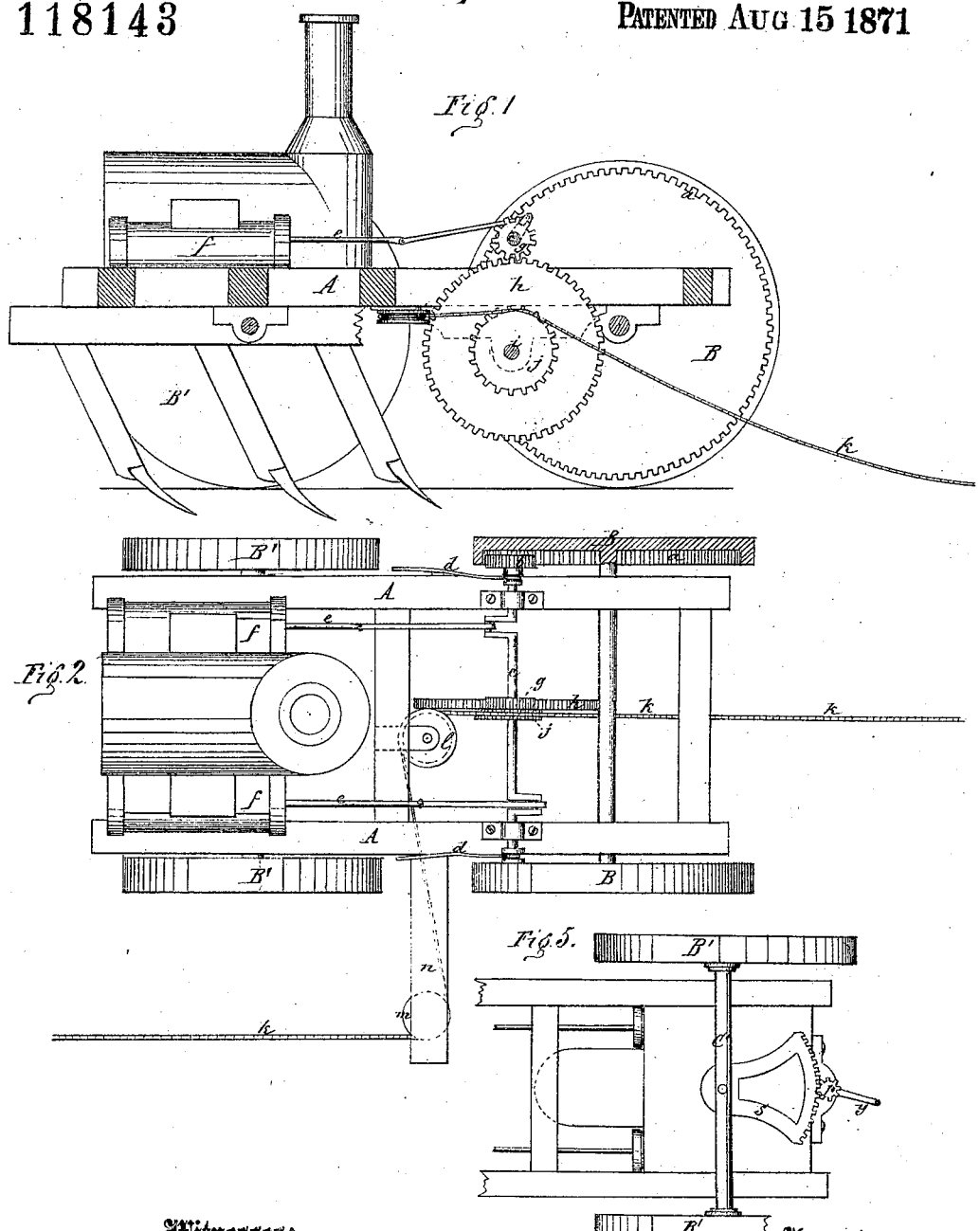

Herman Miller.
118143  Steam-Plow.

Witnesses:

Inventor:
Herman Miller.
Per           Attorneys.

UNITED STATES PATENT OFFICE.

HERMAN MILLER, OF BELLVILLE, TEXAS.

IMPROVEMENT IN STEAM-PLOWS.

Specification forming part of Letters Patent No. 118,143, dated August 15, 1871.

*To all whom it may concern:*

Be it known that I, HERMAN MILLER, of Bellville, in the county of Austin and State of Texas, have invented a new and Improved Steam-Plow; and I do hereby declare the following to be a full, clear, and exact description of the same, reference being had to the accompanying drawing making a part of this specification, in which—

Figure 3:
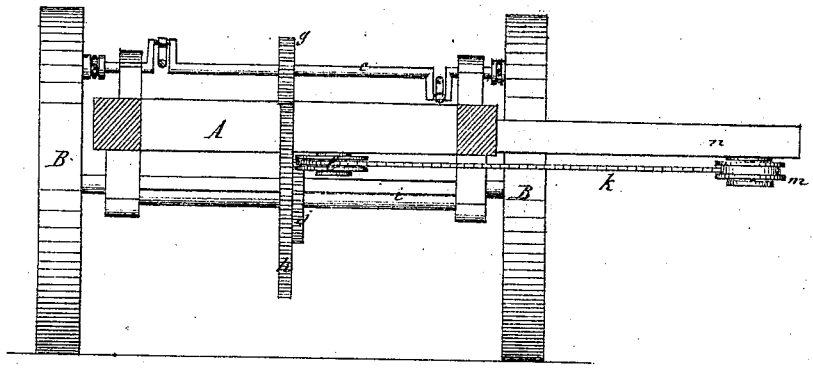
Figure 4:
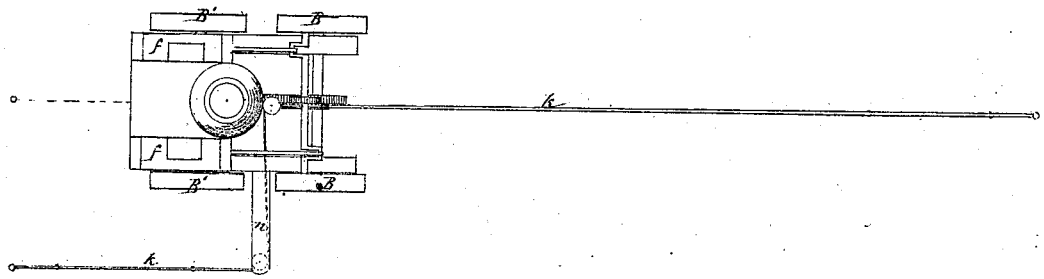

Figure 1 is a partial side and partial sectional elevation. Fig. 2 is a top view. Fig. 3 is a transverse vertical section, and Fig. 4 represents the machine in the act of taking in and paying out the chain. Fig. 5 is a plan view of the under side of part of the machine, showing the steering apparatus.

This invention relates to an improvement in apparatus for turning up soil in which the resistance of the plows is overcome by means of a chain fastened at one end to one side of the field and connected with the apparatus, so that the latter may be propelled by application of motive power by suitable means. In my invention the chain passes over a toothed wheel, which is rotated by a steam-engine supported on the same truck as the shaft of said toothed wheel, which latter hauls in the chain, and thus causes the machine and plows to advance, an apparatus being also provided for paying out the chain at one side of the machine as fast as it is hauled in, said paying-out apparatus leaving the chain stretched on the ground behind the machine in the line in which it must lie in order to be hauled in by the machine on its return. I claim, however, only the specific construction and arrangement of parts or devices, whereby I produce a light, strong, efficient, and superior machine.

Referring to the drawing, A is the frame of the machine, the same being mounted on four transporting-wheels, B B', the two forward wheels having annular gears $a$ with inwardly-projecting teeth on their inner sides, with which gears are made to engage pinions $b$ placed on a shaft, $c$, that is suitably mounted crosswise of the frame A, said pinions being provided with splines which enter grooves in the shaft $c$, and being also connected with levers $d$, whose fulcrums are in the frame A, and whose office is to throw the pinions into or out of gear with the teeth $a$. One of the forward wheels B and one of the rear wheels B' are loose on their respective axles. The shaft $c$ is driven by the pistons $e$ of steam-cylinders $f$ that are suitably mounted on the frame A, and communicate motion through the shaft $c$ and pinions $b$ with the front wheels B. A central pinion, $g$, is also placed upon the shaft $c$, which pinion engages with a spur-gear, $h$, that is placed upon a shaft, $i$, mounted crosswise of the frame A below the shaft $c$. The shaft $i$ bears a spur-gear, $j$, of less diameter than the gear $h$, which gear $j$ is the one that hauls in the chain $k$, the other extremity of which is fastened at that side of the field toward which the machine moves. The sizes of the above-mentioned gears and pinions should bear such relation to each other that the chain $k$ shall not be hauled in any faster than the machine would advance if left to the propulsion of the wheels B alone. The chain $k$ is to be passed around a sheave, $l$, attached horizontally to the frame A in rear of the gear $j$, and from thence the chain should be carried around in front of a sheave, $m$, attached horizontally to a beam, $n$, that extends out from the side of the frame A, and from the sheave $m$ the chain should be led straight backward and fastened to the post or anchor that is next to the one immediately in rear of the machine. The posts or anchors are placed at intervals just equal to the width of the space occupied by the plows, and the sheaves $m$, of which there is one at each side of the machine, should be distant from the gear $j$, which is in the central line of the plows, by an interval also just equal to the width of the space occupied by the plows.

The front and rear ends of the chain being fastened in the above-described manner, it is evident that as the machine advances, plowing a land of the same width at each side of the chain, the latter will be paid out as fast as it is hauled in, and left at a distance from the edge of the plowed portion of land equal to half the width of the latter. Arrived at the edge of the field, the chain is disconnected at points immediately in front and rear of the machine by means of removable links placed in the chain for this purpose, leaving a small portion of the chain in the machine. The machine is then turned about and connection resumed between the piece of chain left in the machine and the end of that left on the ground. The other end of the latter should also be carried around the sheaves $m$ at the other side of the machine from where it passed before, and fastened to the anchor next to the one immediately in line with the gear $j$. The pinion $b$ being again restored to connection with the wheel B, the machine is ready for another stretch. For steering the apparatus so as to enable it to turn I provide a steering apparatus connected with the rear axle and wheels B'. This steering apparatus consists of a segmental-toothed plate, $s$, rigidly connected with the axle C', and pivoted to the frame by a bolt, as shown. A pinion, $x$, on a crank-shaft, $y$, engages with toothed edge of the plate $s$, the same being arranged vertically in suitable bearings attached to the rear end of the frame.

When running the last stretch the chain, instead of being paid out, may be wound up on a drum placed on the frame and revolved by the wheels; and before beginning to plow the machine should be run once across the field, so as to stretch the chain before it is placed in connection with the gear $j$. The drums $m$ may be connected with mechanism for imparting to them rotation, so as to render it unnecessary to fasten the rear end of the chain to the post, thus preventing the swaying of the machine through its connection with the post. It will be understood that one or both of the wheels B on the forward axle must be loose.

The frame A with its wheels and engine, or as it may be termed the self-operating transporting-carriage, may be used for other purposes than that of drawing plows, as, for instance, for carrying loads on common roads.

Having thus described my invention, what I claim as new, and desire to secure by Letters Patent, is—

In a steam-plowing apparatus, the arrangement of the chain-wheel $j$, sheaves $l$ and $m$, spur-gear $h$, pinion $g$, crank-shaft $c$, sliding pinions $b$, and internally-toothed wheels B $a$, as shown and described, whereby they are adapted to operate in connection with the chain fastened at each end outside the machine, as set forth.

HERMAN MILLER.

Witnesses:
  THOS. CHAPMAN,
  JOHN W. GOODE.